United States Patent [19]

Webb

[11] Patent Number: 4,840,256

[45] Date of Patent: Jun. 20, 1989

[54] SURGE BRAKE APPARATUS FOR GOOSENECK TRAILERS

[76] Inventor: James E. Webb, 13809 Hershie St., Houston, Tex. 77015

[21] Appl. No.: 190,656

[22] Filed: May 5, 1988

[51] Int. Cl.[4] ................................................ B60T 7/20
[52] U.S. Cl. ................................ 188/112 R; 280/446.1
[58] Field of Search .......................... 280/432, 446 R; 188/112 R

[56] References Cited

U.S. PATENT DOCUMENTS

| | | | |
|---|---|---|---|
| 2,051,522 | 8/1936 | Graham | 188/112 R |
| 3,285,373 | 11/1966 | Wilson | 188/112 R |
| 3,834,767 | 9/1974 | Bullinger | 188/112 R |
| 4,082,168 | 4/1978 | Cole | 188/112 R |
| 4,653,770 | 3/1987 | Pyle | 188/112 R |

*Primary Examiner*—John A. Pekar
*Attorney, Agent, or Firm*—Kenneth A. Roddy

[57] ABSTRACT

A trailer hitch for actuating the hydraulic brakes of a wheeled trailer responsive to the relative movement between a tow vehicle and the trailer being towed comprises a base plate adapted to be affixed to the tow vehicle and has a sliding plate which moves relative to the tow vehicle and carries a trailer hitch ball to receive the tongue portion of the wheeled trailer. A hydraulic master cylinder is removably mounted on the base plate stationary relative to the sliding plate and connected by conduit to the hydraulic brakes of the towed trailer. An actuating rod on the sliding plate is operatively connected to the master cylinder piston whereby forward movement of the sliding plate will pressurize the fluid therein to activate the wheel brakes of the trailer as the tow vehicle is slowed down. An electric solenoid is removably mounted on the base plate and operated from the two vehicle to selectively move a latch between locked and unlocked positions to prevent relative movement between the sliding plate and the master cylinder whereby the trailer may be backed up by the tow vehicle without actuation of the trailer brakes. The master cylinder may be removed from the tow vehicle and stored on the trailer without disconnecting the hydraulic line, and the solenoid may be removed from the base plate and stored on the tow vehicle without disconnecting the electrical conduit when the trailer is not being towed.

15 Claims, 3 Drawing Sheets

SURGE BRAKE APPARATUS FOR GOOSENECK TRAILERS

BACKGROUND OF THE INVENTION

1. Field of the Invention

This invention relates generally to surge brake apparatus for operating the wheel brakes of trailers, and more particularly to a surge brake apparatus for gooseneck trailers.

2. Brief Description of the Prior Art

Surge braking apparatus for trailers are known in the art. There are several patents which disclose various surge brake apparatus for trailers, all of which are directed toward a surge protector mechanism in the tongue portion of the trailer hitch rather than the ball portion of the coupling. None of the prior art patents are particularly suited for use with a gooseneck trailer wherein the surge protector is mounted in the bed of a truck.

Ewald et al, U.S. Pat. No. 3,880,263 discloses a system in the tongue portion of the trailer hitch wherein a resilient coupling is surrounded by telescoping members to activate a brake cylinder. A shock absorber dampens the force transmitted to the brake cylinder. A solenoid mechanism is connected in a bypass line to the cylinder and actuated by the backup lights when the gear shift is placed in reverse gear to bypass feeding the cylinder and conduct the brake fluid into a reservoir so that the trailer can be backed up.

Parkhurst, U.S. Pat. No. 2,969,857 discloses a bracket in the tongue portion of a trailer coupling which contains a master brake cylinder. A spring dampens the force transmitted to the brake cylinder. A solenoid mechanism is connected in a bypass line to the cylinder and actuated by the backup lights when the gear shift is placed in reverse gear to bypass feeding the cylinder and conduct the brake fluid into a reservoir so that the trailer can be backed up. When backing, a latch mechanism locks the moving parts against movement to render the system inoperative.

Machamer, U.S. Pat. No. 2,574,406 discloses a surge device on the tongue portion of a trailer hitch comprising a pair of spring biased telescoping members and a hydraulic cylinder mounted to the tongue and actuated by an elongate rod extending from the ball portion of the hitch.

Fiske, U.S. Pat. No. 2,630,888 discloses a surge device on the tongue portion of a trailer hitch comprising a hydraulic master brake cylinder mounted on a spring biased draw bar which moves relative to the cylinder upon the towing vehicle being slowed down. The relative movement and degree of braking is adjustably controlled by the spring stiffness.

Davids, U.S. Pat. No. 2,834,436 discloses an automatic brake applicator on the tongue portion of a trailer which includes means for cushioning and controlling the amount of brake application applied to the trailer depending upon the weight of the trailer and its load.

Eksergian, U.S. Pat. No. 3,007,552 discloses a surge protector on the tongue portion of a trailer frame which inhibits the intermittent application and release of the trailer brakes due to the uneven forward movement of the trailer caused by road irregularities. The device employs a swinging instead of sliding movement between relatively movable parts.

Krotz, U.S. Pat. No. 3,065,830 discloses an emergency brake mechanism in the tongue portion of a trailer frame which automatically applies the brakes of the trailer in the event it vehicle accidentally becomes disconnected from the towing vehicle.

Wherry, U.S. Pat. No. 3,215,230 discloses a surge device employing two members which move relative to one another and which are connected to the towing vehicle and the trailer respectively. A brake cylinder and shock absorber are mounted on one of the members and connected to a lever pivotally attached to the other member which compresses a spring for actuation of the master cylinder piston rod. The spring is the force upon which operation of the master cylinder is directly dependent, rather than the relative movement of the two members.

Kolm, U.S. Pat. No. 3,796,287 discloses a surge protector in the tongue portion of the hitch for providing a force multiplication whereby an increased fluid pressure output can be obtained particularly for disk brake actuation. The force multiplication apparatus includes a toggle linkage system and a cam that actuates the joint of the toggle linkage. A shock absorber provides a smoother brake operation.

The present invention is distinguished over the prior art in general, and these patents in particular by a surge brake apparatus comprising a base plate adapted to be affixed to the tow vehicle and having a sliding plate which moves relative to the tow vehicle and carries a trailer hitch ball to receive the tongue portion of the wheeled trailer. A hydraulic master cylinder is removably mounted on the base plate stationary relative to the sliding plate and connected by conduit to the hydraulic brakes of the towed trailer. An actuating rod on the sliding plate is operatively connected to the master cylinder piston whereby forward movement of the sliding plate will pressurize the fluid therein to activate the wheel brakes of the trailer as the tow vehicle is slowed down. An electric solenoid is removably mounted on the base plate and operated from the tow vehicle to selectively move a latch between locked and unlocked positions to prevent relative movement between the sliding plate and the master cylinder whereby the trailer may be backed up by the tow vehicle without actuation of the trailer brakes. The master cylinder may be removed from the tow vehicle and stored on the trailer without disconnecting the hydraulic line, and the solenoid may be removed from the base plate and stored on the tow vehicle without disconnecting the electrical conduit when the trailer is not being towed.

SUMMARY OF THE INVENTION

It is therefore an object of the present invention to provide a surge brake apparatus for gooseneck trailers for uniformly actuating the wheel brakes of a towed trailer responsive to the slowing or braking action of the tow vehicle.

It is another object of this invention to provide a surge brake apparatus for gooseneck trailers which is quickly and easily installed and removed.

Another object of this invention is to provide a surge brake apparatus for gooseneck trailers which does not require disconnection of the hydraulic system of the trailer when not in use.

Another object of this invention is to provide a surge brake apparatus for gooseneck trailers in which the actuating members may be quickly and easily removed and stored in a convenient location on the vehicle to which they are connected.

Another object of this invention is to provide a surge brake apparatus for gooseneck trailers which does not require extensive modification of the existing electrical or hydraulic systems of the trailer or tow vehicle.

A further object of this invention is to provide a surge brake apparatus for gooseneck trailers which utilizes readily available conventional hydraulic and electrical components and does not require modification of the tongue portion of the trailer.

A still further object of this invention is to provide a surge brake apparatus for gooseneck trailers which is simple in construction, economical to manufacture, reliable in operation, and rugged and durable in use.

Other objects of the invention will become apparent from time to time throughout the specification and claims as hereinafter related.

The above noted objects and other objects of the invention are accomplished by a trailer hitch for actuating the hydraulic brakes of a wheeled trailer responsive to the relative movement between a tow vehicle and the trailer being towed comprising a base plate adapted to be affixed to the tow vehicle and has a sliding plate which moves relative to the tow vehicle and carries a trailer hitch ball to receive the tongue portion of the wheeled trailer. A hydraulic master cylinder is removably mounted on the base plate stationary relative to the sliding plate and connected by conduit to the hydraulic brakes of the towed trailer. An actuating rod on the sliding plate is operatively connected to the master cylinder piston whereby forward movement of the sliding plate will pressurize the fluid therein to activate the wheel brakes of the trailer as the tow vehicle is slowed down. An electric solenoid is removably mounted on the base plate and operated from the tow vehicle to selectively move a latch between locked and unlocked positions to prevent relative movement between the sliding plate and the master cylinder whereby the trailer may be backed up by the tow vehicle without actuation of the trailer brakes. The master cylinder may be removed from the tow vehicle and stored on the trailer without disconnecting the hydraulic line, and the solenoid may be removed from the base plate and stored on the tow vehicle without disconnecting the electrical conduit when the trailer is not being towed.

DESCRIPTION OF THE PREFERRED EMBODIMENT

Figure 1:
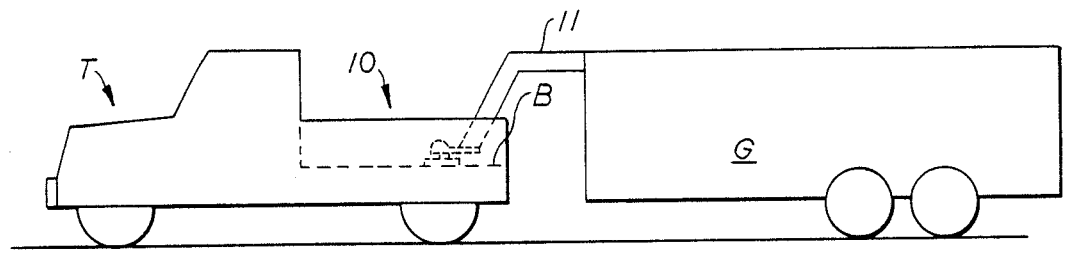
FIG. 1 is a side elevation of the surge brake apparatus in accordance with the present invention installed in the bed of a pickup truck and connected to a gooseneck trailer.
Figure 2:
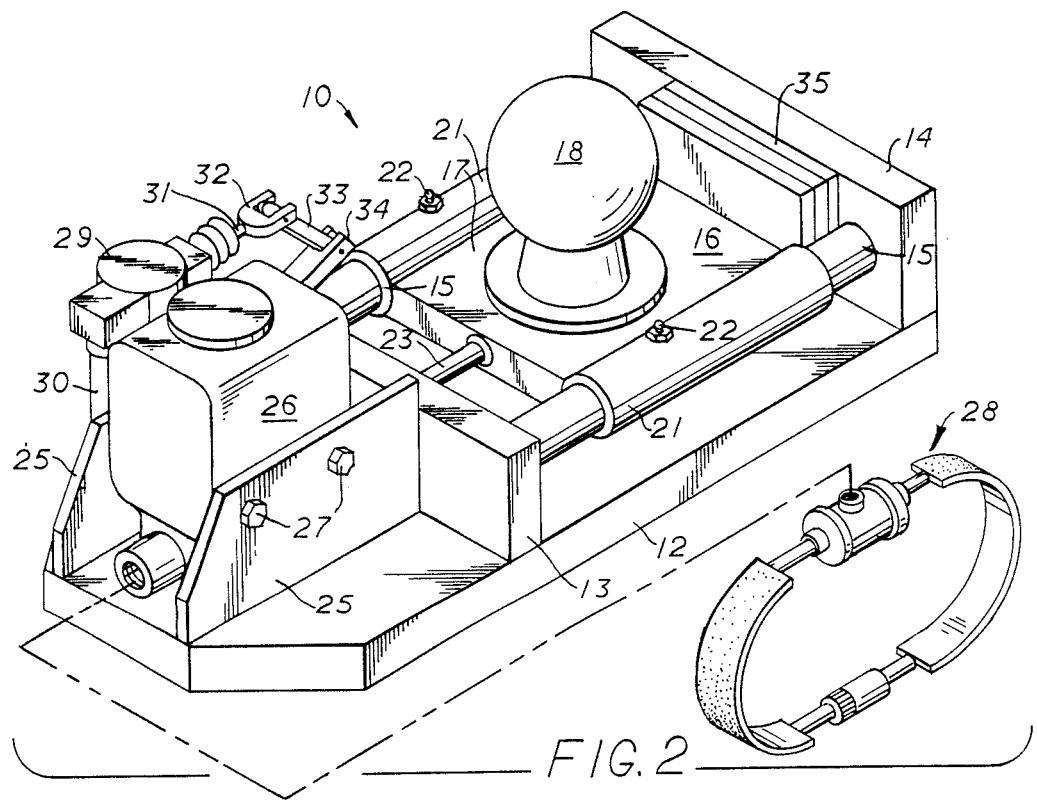
FIG. 2 is an isometric view of a preferred surge brake apparatus for gooseneck trailers in accordance with the present invention.
Figure 3:
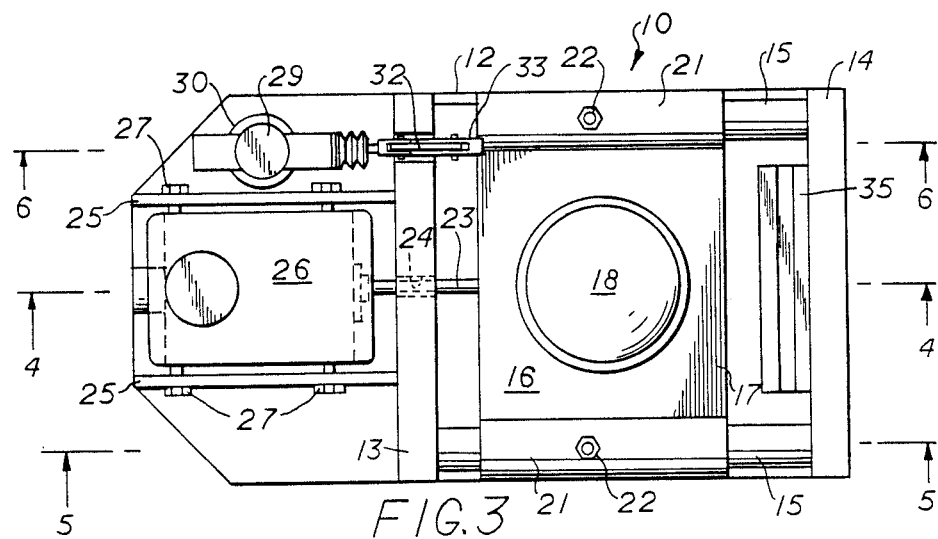
FIG. 3 is a top plan view of the surge brake apparatus of FIG. 2.
Figure 4:
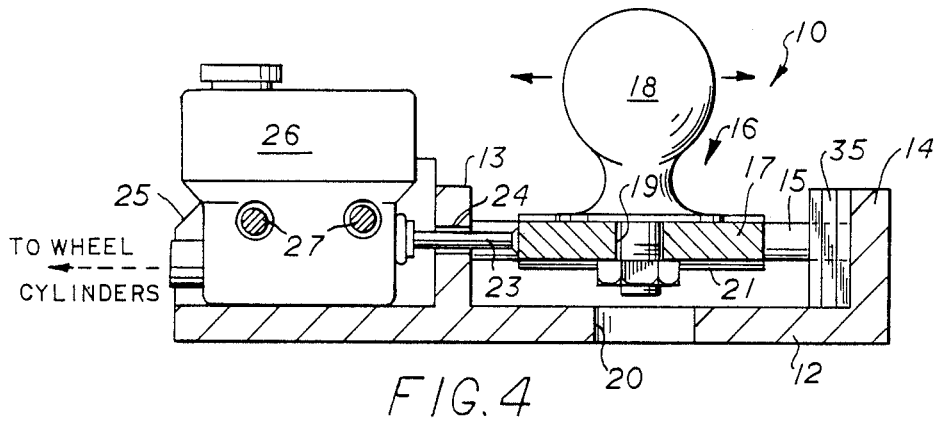
FIG. 4 is a longitudinal cross section of the surge brake apparatus taken along lines 4—4 of FIG. 2.
Figure 5:
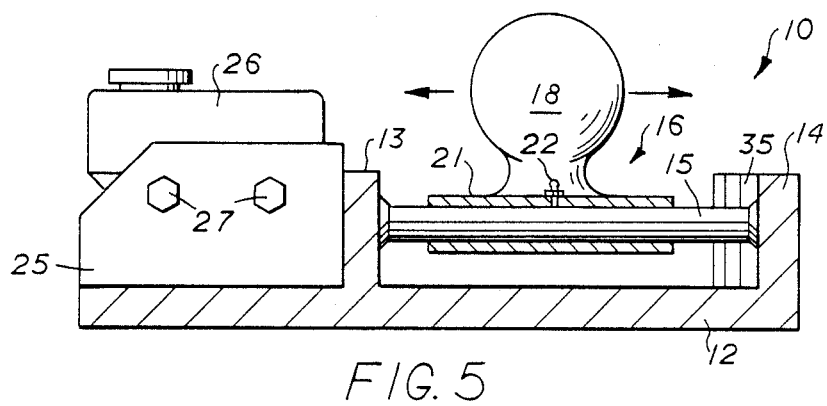
FIG. 5 is a longitudinal cross section of the surge brake apparatus taken along lines 5—5 of FIG. 2.
Figure 6:
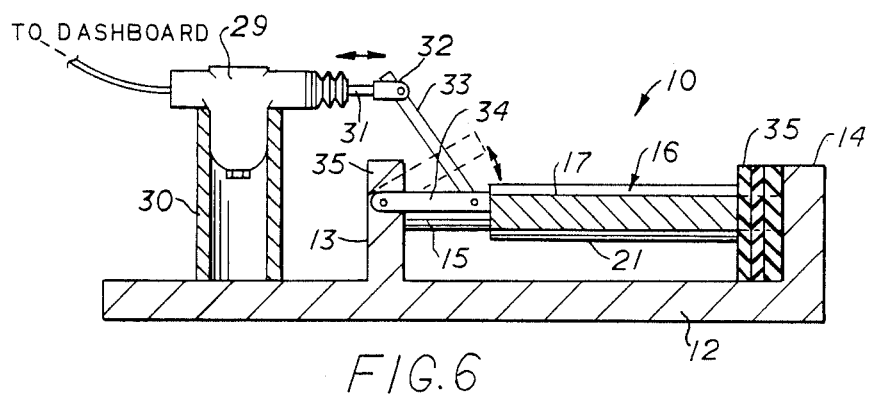
FIG. 6 is a longitudinal cross section of the surge brake apparatus taken along lines 6—6 of FIG. 2.

Referring to the drawings by numerals of reference, there is shown in FIG. 1, a preferred surge brake apparatus 10 installed in the bed B of a pickup truck or towing vehicle T and connected to the tongue portion 11 of a gooseneck trailer G.

As shown in FIGS. 2-6, the surge brake apparatus 10 comprises a flat rectangular base plate 12 which is mounted on the floor of the truck bed by conventional means such as welding or bolting. A pair of parallel spaced upstanding support plates 13 and 14 are secured transversely to the base plate 12 to extend thereacross. Support plate 14 is secured at one end of the base plate 12 and the other support plate 13 is secured intermediate the ends of the base plate 12.

A pair of cylindrical rod members 15 are secured between the support plates 13 and 14 in a parallel spaced relation above the top surface of the base plate and extend longitudinally near opposite sides thereof to slidably support a sliding block assembly 16. The sliding block assembly 16 comprises a flat plate 17 on which a trailer hitch ball 18 is centrally mounted by conventional means such as bolting through a hole 19 in the flat plate 17. Another hole 20 may be provided in the base plate 12 for access to the bolted connection. It should be understood that various sizes of balls may be interchanged by simply removing one and bolting on another one of desirable size.

A pair of cylindrical sleeves 21 are secured to opposite sides of the flat plate 17, and may be provided with grease fittings 22 which communicate with the interior diameter of the sleeves. The sleeves 21 are slidably mounted on the rod members 15 prior to securing the rod members between the support plates 13 and 14. From the foregoing description, it can be seen that the sliding block assembly 16 is free to slide longitudinally on the rods 15 between the support plates 13 and 14. An actuating rod 23 is secured to the one end of the flat plate 17 and extends slidably through a slot or hole 24 in the support plate 13.

A pair of laterally spaced, upstanding parallel mounting plates or ears 25 are secured to the base plate 12 and support plate 13 to extend longitudinally from the plate 13 to the end of the base plate 12. A conventional hydraulic master brake cylinder 26 is removably mounted between the ears 25 by installing bolts 27 transversely through axially aligned holes in the ears (not shown) and master cylinder 26. The actuating rod 23 is received in the movable piston portion of the master cylinder 26 to move the piston upon forward movement of the sliding block assembly 16.

The master cylinder 26 is connected by flexible hydraulic lines to the wheel cylinders of conventional disc or shoe brakes 28 on the trailer. When the towing vehicle slows down, the sliding block 16 slides forward relative to the base plate 12 due to the weight being hauled in the trailer. The forward movement pushes the actuating rod 23 into the master cylinder pressurizing the fluid therein to apply the brakes on the trailer.

An electrical solenoid 29 is removably received in a short vertical mounting sleeve 30 secured to the base plate 12. The movable arm 31 of the solenoid 29 is provided with a yoke 32 which is pivotally connected by a link member 33 to a reverse locking latch 34. A quick release pin connection is preferred at the pivotal connection of the yoke and link member so that the solenoid can disconnected from the link member. The reverse locking latch 34 comprises a rectangular lever bar 34 pivotally connected at one end in a notch or slot 35 in the support plate 13 and at its other end to the link member 33. The solenoid 29 is controlled from a switch (not shown) on the dashboard of the towing vehicle T to prevent or allow sliding movement of the sliding block 16 relative to the base plate 12.

A resilient pad 35 may be secured on the inward side of the support plate 14 to provide a cushion between the sliding block 16 and the support plate 14 when the towing vehicle moves forward relative to the trailer.

The solenoid 29 normally maintains the latch 34 in a raised position allowing longitudinal movement of the sliding block 16 on the rods 15. When it is desired to back the trailer, the solenoid 29 is actuated by the switch on the dashboard to drop the latch 34 to a lowered or locked position parallel to the flat plate 17 of the sliding block. In the locked position, the latch 34 is disposed between the support plate 13 and the flat plate 17 to prevent relative movement therebetween, and the trailer may be backed without the actuating rod 23 moving the master cylinder piston to apply the brakes of the trailer.

Figure 7:
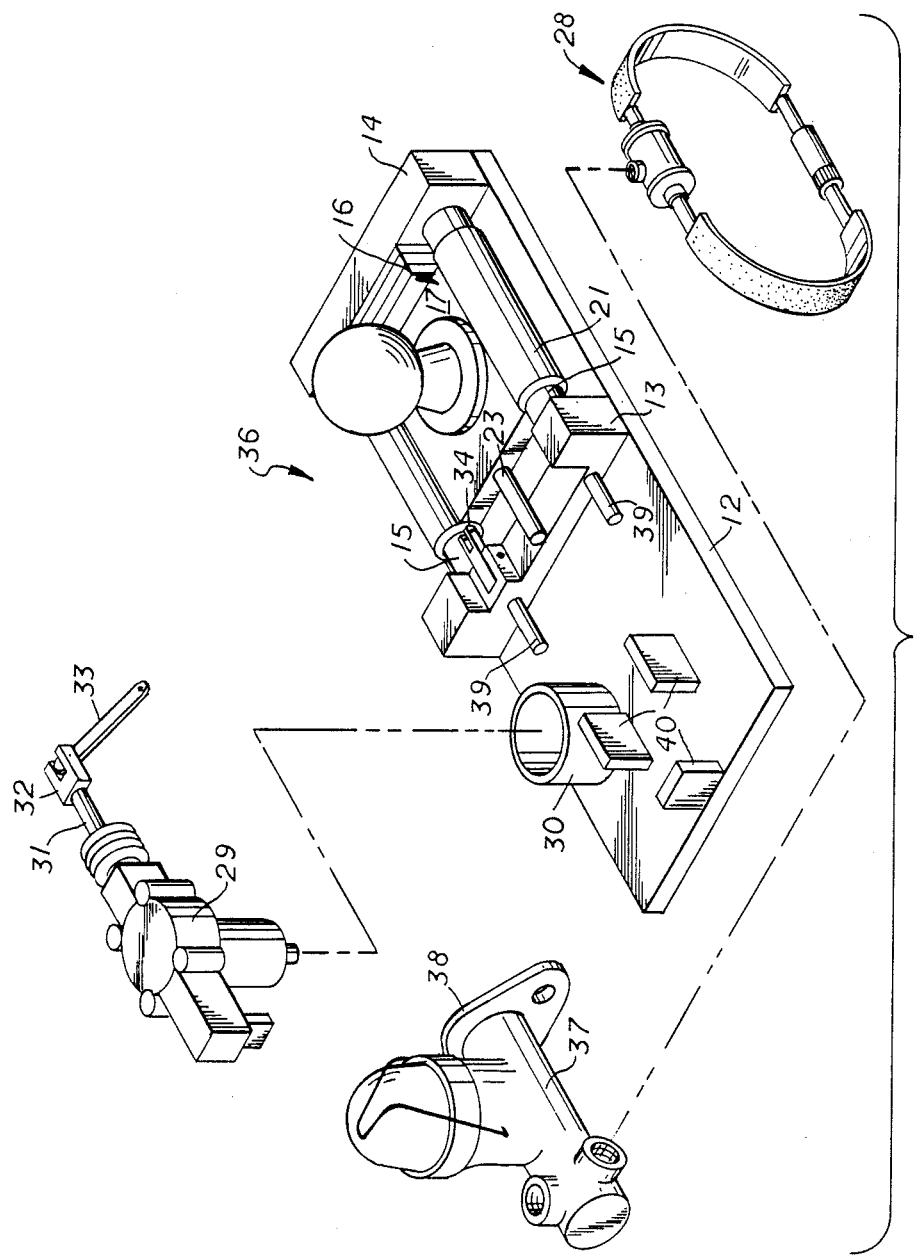
FIG. 7 is a side elevation of the surge brake apparatus in accordance with the present invention installed in the bed of a pickup truck and connected to a gooseneck trailer.

FIG. 7 shows a modified form of the surge brake apparatus 36 which is quickly disassembled. In the following description, the components previously described with reference to the previous figures are assigned the same numerals of reference and their description will not be repeated to avoid repetition. The modified surge brake apparatus 36 has essentially the same components as previously described, but receives a different master cylinder configuration 37 which has a flanged end 38.

A pair of laterally spaced, parallel line-up pins 39 extend outwardly from the support plate 13, and three relatively small upstanding parallel mounting plates or ears 40 are secured to the base plate 12 to form an open box-like support frame near one end of the base plate. A conventional flanged hydraulic master brake cylinder 37 is removably received between the ears 40 by sliding the flange 38 onto the pins and moving the master cylinder thereon until the periphery of the master cylinder fits between the ears 40. The actuating rod 23 is received in the flanged portion of the master cylinder 37 to move the movable piston contained therein upon forward movement of the sliding block assembly 16.

The other components are assembled in the manner previously described. By using flexible hydraulic lines between the trailer and the master cylinder 26 or 37, the master cylinder may be easily removed from the base plate. The cylinder 26 is removed by unfastening the bolts 27 and lifting it from the base plate. The flanged type master cylinder 37 is removed by simply lifting it out of the ears 40. In this manner, the master cylinder may be stored on the trailer when the trailer is not being towed without disconnecting the hydraulic lines and the towing vehicle may be used for other purposes. If desired, the base plate 12 may also be unbolted from the floor of the truck bed to allow full usage of the floor.

OPERATION

To use the surge brake apparatus, the tongue of the trailer is connected on the hitch ball 18 and the master cylinder is removed from its stored location and placed in the ears 25 or 40 with the actuating rod 23 received in the movable piston portion of the master cylinder to move the piston. The solenoid 29 is placed in the mounting sleeve 30, and the trailer is ready to be towed.

When the towing vehicle slows down, the sliding block 16 slides forward relative to the base plate 12 due to the weight being hauled in the trailer. The forward movement of the sliding block 16 pushes the actuating rod 23 into the master cylinder moving the piston therein to pressurize the fluid and apply the brakes on the trailer.

The solenoid 29 normally maintains the latch 34 in the raised position allowing the sliding block to move. When it is desired to back the trailer, the solenoid 29 is actuated by the switch on the dashboard to drop the latch 34 to the lowered or locked position. In the locked position, the latch 34 is disposed between the support plate 13 and the flat plate 17 to prevent relative movement therebetween, and the trailer may be backed without actuating the master cylinder to apply the brakes of the trailer.

When the trailer is to be removed from the towing vehicle, the tongue portion of the trailer is disconnected from the ball 18 and the master cylinder is removed by unfastening the bolts 27 (if any) and lifting it from the base plate. In this manner, the master cylinder may be stored on the trailer when the trailer is not being towed without disconnecting the hydraulic lines and the towing vehicle may be used for other purposes. The solenoid 29 is simply lifted out of the mounting sleeve 30 and stored in a suitable location in the truck bed or in the cab. If desired, the base plate 12 may also be unbolted from the floor of the truck bed to allow full usage of the floor.

While this invention has been described fully and completely with special emphasis upon a preferred embodiment, it should be understood that within the scope of the appended claims the invention may be practiced otherwise than as specifically described herein.

I claim:

1. A trailer hitch for actuating the hydraulic brakes of a wheeled trailer responsive to the relative movement between a two vehicle and the trailer being towed comprising:

a hitch member having a base plate adapted to be affixed to the tow vehicle and a second plate movably mounted thereon for longitudinal movement relative to the base plate and the tow vehicle and the second plate having trailer connecting means thereon which moves therewith and which is adapted to receive the tongue portion of the wheeled trailer, said second plate slidably mounted and supported on a pair of elongate cylindrical rod members secured on said base plate in a parallel spaced relation above the top surface thereof and movable relative to said base plate upon relative movement between the towed trailer and the tow vehicle, a master hydraulic cylinder removably mounted on said base plate stationary relative to said second plate and connected by conduit to the hydraulic brakes of the towed trailer and having a movable piston therein for creating a hydraulic fluid pressure to actuate the hydraulic trailer brakes, actuating means carried on said second plate and operatively connected to said master cylinder piston whereby forward movement of said second plate relative to said master cylinder will cause said actuating means to pressurize the fluid therein to activate the wheel brakes of the trailer as the tow vehicle is slowed down, and releasable lock means for selectively preventing relative movement between said movable trailer connecting means and said master cylinder whereby the trailer may be backed up by the tow vehicle without actuation of the trailer brakes.

2. A trailer hitch according to claim 1 in which said trailer connecting means comprises a ball member removably connected to said hitch member to receive the tongue hitch portion of the towed trailer.

3. A trailer hitch according to claim 1 in which said actuating means comprises a rod member extending outwardly from the forward end of said second plate and the extended end connected to the movable piston of said master cylinder to pressurize the fluid therein upon sufficient forward movement of said second plate.

4. A trailer hitch according to claim 1 including lubricating means on said second plate for facilitating sliding movement of same on said rod members.

5. A trailer hitch according to claim 1 in which said rod members are secured between a pair of parallel spaced upstanding support plates secured transversely to said base plate to extend thereacross, one of said support plates secured at one end of said base plate and the other secured intermediate the ends of the base plate.

6. A trailer hitch according to claim 5 in which said second plate has a tubular sleeve on two opposed sides thereof which are slidably received and supported on said parallel rod members between said upstanding support plates.

7. A trailer hitch according to claim 6 including lubricating means on said tubular sleeves for facilitating sliding movement of same on said rod members.

8. A trailer hitch according to claim 1 in which said master cylinder is removably mounted between two or more laterally spaced, upstanding mounting plates on said base plate.

9. A trailer hitch according to claim 1 including a resilient pad secured between said base plate and said second plate to provide a shock absorbing cushion therebetween when the base plate moves forward relative to the second plate due to the tow vehicle moving forward relative to the trailer.

10. A trailer hitch according to claim 1 in which said releasable lock means comprises an electrical solenoid removably mounted on said base plate and operatively connected to a latch member for selectively positioning same relative to said second plate between an unlocked position allowing sliding movement of said second plate and a locked position preventing sliding movement of said second plate, whereby in the locked position the trailer may be backed without said actuating means moving the master cylinder piston to apply the trailer brakes.

11. A trailer hitch according to claim 10 in which said solenoid is connected to the electrical system of the tow vehicle by electrical conduit and operated by switch means on the tow vehicle to move said latch member between the locked and unlocked positions.

12. A trailer hitch according to claim 11 in which at least a portion of said electrical conduit connecting said solenoid to the tow vehicle is flexible, whereby said solenoid may be removed from said hitch on the tow vehicle and stored on the tow vehicle the trailer is not being towed without disconnecting the conduit.

13. A trailer hitch according to claim 10 in which said solenoid is removably received in a tubular sleeve secured vertically on said base plate.

14. A trailer hitch according to claim 10 in which said latch member comprises a generally rectangular lever bar pivotally mounted at one end to said base plate and pivotally connected at its other end by a link member to the movable arm member of said solenoid.

15. A trailer hitch according to claim 1 in which at least a portion of said conduit connecting said master cylinder to the hydraulic brakes of the towed trailer is flexible, whereby said master cylinder may be removed from said hitch on the tow vehicle and stored on the trailer when the trailer is not being towed without disconnecting the conduit.

* * * * *